G. B. N. TOWER.
Steam-Generator.
No. 207,831.    Patented Sept. 10. 1878.
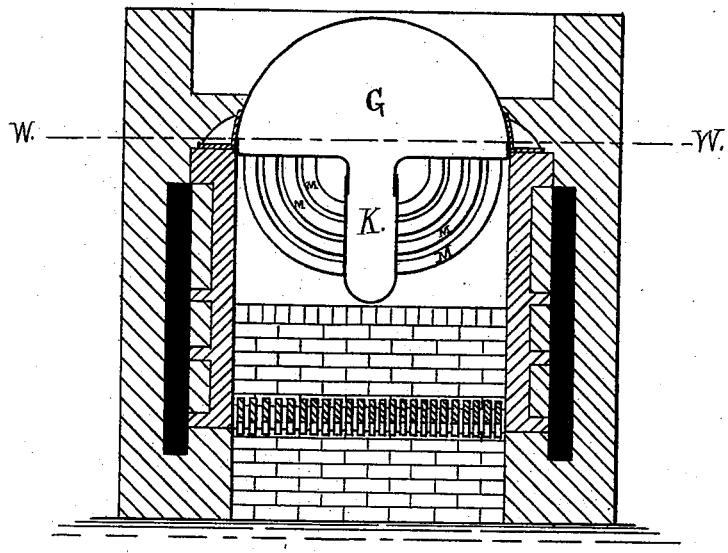
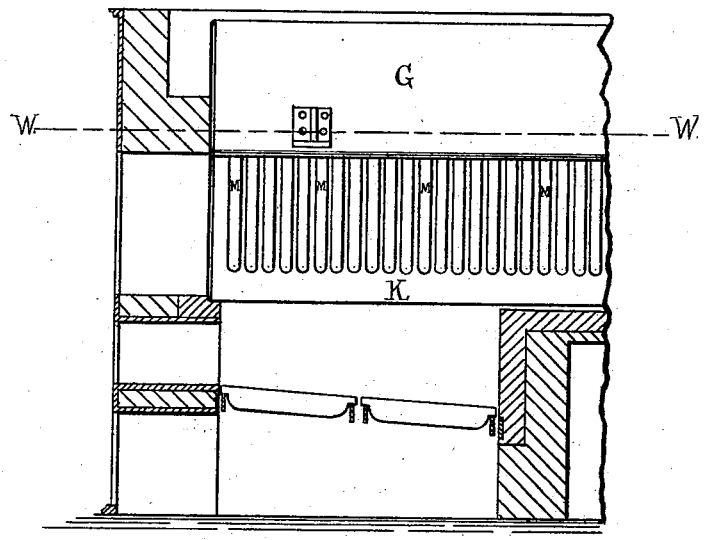

UNITED STATES PATENT OFFICE.

GEORGE B. N. TOWER, OF CAMBRIDGE, ASSIGNOR OF ONE-HALF HIS RIGHT TO LYDIE F. RENSHAW, OF COHASSETT, MASSACHUSETTS.

IMPROVEMENT IN STEAM-GENERATORS.

Specification forming part of Letters Patent No. 207,831, dated September 10, 1878; application filed March 2, 1878.

*To all whom it may concern:*

Be it known that I, GEORGE B. N. TOWER, of Cambridge, in the county of Middlesex and State of Massachusetts, have invented a new and useful Improvement in Steam-Generators, which improvement is fully set forth in the following specification and accompanying drawings.

The object of my invention is to improve on the sectional steam-generator patented to Lydie F. Renshaw October 3, 1876, (patent numbered 182,773,) by making the boiler in two main parts—first, a shell, and, second, a series of small pipes, the boiler-shell with a deep longitudinal recess in it, this recess being crossed by the series of small pipes, as will now be more fully described.

The boiler-shell is made by riveting together plates of iron into the form of a long water-body, G, and a long water-leg, K, the bottom of the water-body G forming, with the side of the water-leg K, a recess along the whole length of the shell, as shown in the drawings, this recess forming two walls of a flue, the sides of the furnace forming the other two walls, as shown. Across this recess formed along the shell of the boiler the series of small pipes M extend.

The shell G K must, of course, be properly stayed. It constitutes in itself a boiler, not differing from the ordinary boilers made of boiler-plate, except in shape.

The series of cross-tubes M do not differ subtantially from those shown in Patent No. 198,213 to D. Renshaw and myself, which I hereby disclaim; but the novelty which distinguishes my invention from all others known to me is the shell G K, provided with the recess described, the two walls of which are formed by the side of K and the bottom of G, in combination with a series of cross-pipes, M, as shown in the drawings.

The boiler is made double—that is, with two recesses—the upper part, G, semi-cylindrical or single—that is, with but one recess—the upper part, G, being in shape a segment of a cylinder.

My boiler differs widely in construction, as well as in operation, from that described in the Patent No. 198,213 above mentioned, that being a flue-boiler with the flues entirely surrounded by water, and this feature of water outside the flues renders the circulation materially different from the circulation in my boiler.

I am aware that in the Patent No. 182,773 above mentioned series of pipes are shown, in combination with an upper water-body and a water-leg; but the water-body and water-leg in those patents are merely sections of a boiler, and the boiler proper consists of a number of those sections connected together, while in my boiler the single shell G K constitutes the main part of the boiler, and each pipe of the series of pipes M is connected to this single shell.

In view of this patent my present invention consists in the single shell G K, recessed as described, in combination with a series of pipes, M, as distinguished from a series of water-bodies and water-legs, or a single upper water-body with a series of water-legs, as suggested in the Patent No. 182,773.

The circulation of the water in my boiler is obviously wholly different from the circulation of the water in the boiler shown in Patent No. 182,773, and the construction of my boiler is also wholly different from that, the main part of my boiler being a single shell, recessed as described, instead of a number of sections flanged together, and my series of small pipes are each joined to this single shell instead of constituting a number of series of pipes, each series joined only to its own section.

My boiler is not a sectional boiler.

What I claim as my invention is—

The improved boiler herein described, consisting of the shell G K, recessed as described, in combination with the series of pipes M, arranged across that recess connecting the parts G K, as described.

G. B. N. TOWER.

Witnesses:
CHAS. STEERE,
CHAS. F. SLEEPER.